United States Patent
Zhang et al.

(10) Patent No.: US 10,243,689 B2
(45) Date of Patent: Mar. 26, 2019

(54) INTERFERENCE MITIGATION IN WLAN/WPAN CO-EXISTENCE NETWORKS

(71) Applicant: SIGNIFY HOLDING B.V., Eindhoven (NL)

(72) Inventors: Zhizhong Zhang, Shanghai (CN); Koen Johanna Guillaume Holtman, Eindhoven (NL); Peilang Dong, Shanghai (CN); Jun Yao, Shanghai (CN); Hai Tao Liu, Shanghai (CN); Gang Wang, Shanghai (CN); Dunfa Chen, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/313,181

(22) PCT Filed: May 22, 2015

(86) PCT No.: PCT/EP2015/061463
§ 371 (c)(1),
(2) Date: Nov. 22, 2016

(87) PCT Pub. No.: WO2015/177363
PCT Pub. Date: Nov. 26, 2015

(65) Prior Publication Data
US 2017/0207877 A1 Jul. 20, 2017

(30) Foreign Application Priority Data

May 22, 2014 (WO) ................ PCT/CN2014/000516
Jun. 20, 2014 (EP) .................................... 14173208

(51) Int. Cl.
*H04B 7/15* (2006.01)
*H04B 7/00* (2006.01)
(Continued)

(52) U.S. Cl.
CPC ................. *H04K 3/86* (2013.01); *H04K 3/42* (2013.01); *H04K 3/43* (2013.01); *H04K 3/45* (2013.01);
(Continued)

(58) Field of Classification Search
CPC ....................................................... H04K 3/86
(Continued)

(56) References Cited

U.S. PATENT DOCUMENTS 8,340,580 B1 12/2012 Epstein
8,588,699 B2 * 11/2013 Park .................... H04W 72/082
455/450
(Continued)

FOREIGN PATENT DOCUMENTS

JP 2016082554 A 5/2016
WO 2010001320 A1 1/2010
(Continued)

OTHER PUBLICATIONS

Yi, Peizhong et al., "Developing Zigbee Deployment Guideline Under Wifi Interference for Smart Grid Applications," IEEE Transactions on Smart Grid, vol. 2, No. 1, Mar. 2011 (11 Pages).
(Continued)

*Primary Examiner* — Ankur Jain
(74) *Attorney, Agent, or Firm* — Meenakshy Chakravorty

(57) ABSTRACT

This invention generally relates to interference mitigation, and more specifically to interference mitigation in wireless communications networks. The proposed solution takes advantage of the clear channel assessment (CCA) function used by WLAN networks. Hence, by jamming the interfering WLAN channel during a predetermined time period, the interfering WLAN network is forced to withhold transmissions on the WLAN interfering channel during a backoff period of time. The solution of the subject application makes
(Continued)

use of this backoff period to enable a WPAN network to transmit critical information such as, but not limited to, a request for changing the current working frequency.

15 Claims, 4 Drawing Sheets

(51) Int. Cl.
| | |
|---|---|
| *H04K 3/00* | (2006.01) |
| *H04W 4/80* | (2018.01) |
| *H04W 74/08* | (2009.01) |
| *H04W 48/02* | (2009.01) |
| *H04W 84/10* | (2009.01) |
| *H04W 84/18* | (2009.01) |
| *H04W 84/12* | (2009.01) |

(52) U.S. Cl.
CPC ......... *H04W 4/80* (2018.02); *H04W 74/0816* (2013.01); *H04K 2203/18* (2013.01); *H04W 48/02* (2013.01); *H04W 84/10* (2013.01); *H04W 84/12* (2013.01); *H04W 84/18* (2013.01)

(58) Field of Classification Search
USPC .................................... 455/1, 517, 519, 11.1
See application file for complete search history.

(56) References Cited

U.S. PATENT DOCUMENTS

| | | | | |
|---|---|---|---|---|
| 2008/0293353 | A1* | 11/2008 | Mody | H04K 3/226 455/1 |
| 2010/0091731 | A1* | 4/2010 | Kim | H04W 16/14 370/329 |
| 2012/0164948 | A1 | 6/2012 | Narasimha et al. | |
| 2012/0207040 | A1* | 8/2012 | Comsa | H04W 72/1215 370/252 |
| 2013/0077552 | A1 | 3/2013 | Lee | |
| 2016/0007362 | A1* | 1/2016 | Ayadurai | H04W 72/085 370/329 |
| 2016/0066325 | A1* | 3/2016 | Kim | H04W 74/0816 370/329 |

FOREIGN PATENT DOCUMENTS

| | | |
|---|---|---|
| WO | 2012103177 A1 | 8/2012 |
| WO | 2013114263 A1 | 8/2013 |
| WO | 2013149878 A1 | 10/2013 |
| WO | 2013149978 A1 | 10/2013 |

OTHER PUBLICATIONS

Zhang, Xinyu et al., "Enabling Coexistence of Heterogeneous Wireless Systems: Case for Zigbee and Wifi," Department of Electrical Engineering and Computer Science, The University of Michigan, 2011 (11 Pages).

Lim, Sangsoon et al., "NBP: Light-Weight Narrow Band Protection for Zigbee and Wi-Fi Coexistence," EURASIP Journal on Wireless Communications and Networking, 2013 (13 Pages).

* cited by examiner

INTERFERENCE MITIGATION IN WLAN/WPAN CO-EXISTENCE NETWORKS

CROSS-REFERENCE TO PRIOR APPLICATIONS

This application is the U.S. National Phase application under 35 U.S.C. § 371 of International Application No. PCT/EP2015/061463, filed on May 22, 2015, which claims the benefit of Chinese Patent Application No. PCT/CN2014/000516, filed on May 22, 2014, and European Patent Application No. 14173208.1, filed on Jun. 20, 2014. These applications are hereby incorporated by reference herein.

FIELD OF THE INVENTION

The invention generally relates to interference mitigation, and more specifically to interference mitigation in wireless communications networks.

BACKGROUND OF THE INVENTION

Wireless communications is one of the fastest growing technologies. The phenomenal growth of this technology has seen in the recent years has been notably due to the ease of implementation and deployment. Recently, advancements of various wireless technologies in the 2.4 GHz ISM (industrial, scientific and medical) frequency band have been used in numerous electronic devices. This situation has led to the co-channel coexistence of heterogeneous wireless devices, such as Wi-Fi, Bluetooth and Zigbee. The sharing of the same frequencies results in the challenging problem of inter-system interference between wireless technologies using the ISM frequency band.

This problem of the radio interference between wireless technologies is often treated by detecting and avoiding interference, namely by changing the current working frequency to another frequency expected to suffer less from interference than the current one. US application 20130077552 describes such a method and apparatus for avoiding frequency interference in a local area wireless network when each member device detects the frequency interference. However, for instance, when wireless local area network (WLAN) interference (e.g. a Wi-Fi interference) occurs on a wireless personal area network (WPAN), such as Zigbee, RF4CE and 6LoWPAN, some or entire clusters members of the WPAN may have difficulty in communicating with their cluster head. In fact, this may cause to generate broken clusters.

Also, because the frequency resources in the ISM frequency band are scarce, changing from a current frequency to another one is not always possible. Additionally, switching the operation of several nodes of a network at once, generates considerable extra cost to the network. Particularly, when there are several interferers in the vicinity operating at different channels. In this case, channel switching may happen very often, thus leading to unstable operation of the network. This situation is problematic, especially where critical messages need to be transmitted to all nodes of a wireless network, such as in a Zigbee network.

It would then be advantageous to provide a new mechanism for enabling critical messages to be transmitted to all nodes of a wireless network where it is difficult or not possible to avoid detected frequency interference.

SUMMARY OF THE INVENTION

The present subject application provides a wireless network node, a system and a method of providing interference mitigation in wireless personal area network (WPAN) suffering from interference originating from a wireless local area network (WLAN).

Certain embodiments of the subject application include a wireless network node for providing a wireless personal area network (WPAN) node operating on a first WPAN channel and adapted to provide interference mitigation, the interference originating from a wireless local area network (WLAN) using a clear channel assessment (CCA) function to cause the WLAN to transmit. The WLAN operates on a WLAN channel which bandwidth is greater than the first WPAN channel bandwidth. The wireless network node comprises:
  an interference detector adapted to generate an interference indicator upon detection of an interfering signal in the first WPAN channel;
  at least one transmitter adapted to transmit a jamming signal; and,
  a processor operably coupled to the memory, the interference detector, the receiver and the transmitter.

The processor is adapted to operate in at least one of a normal mode and a mitigation mode. In the normal mode, the processor is configured to determine whether an interference indicator is greater than a given interference threshold. The processor operates in the mitigation mode when the interference indicator is greater than the given interference threshold. In the mitigation mode, the processor is configured to:
  generate the jamming signal; and,
  determine one neighbouring second WPAN channel different from the first WPAN channel, based on at least the interference indicator, the second WPAN channel being at least partly comprised within the WLAN channel bandwidth; and,
  instruct the transmitter to continuously transmit the jamming signal in the second WPAN channel during a predetermined time period, at a given output power level sufficiently high so that the CCA function on the WLAN determines that it is not temporarily appropriate to transmit on the WLAN channel.

In certain embodiments of the subject application, it is included an interference mitigation system for providing interference mitigation in a wireless personal area network (WPAN) operating on a first WPAN channel, the interference originating from a wireless local area network (WLAN) using a clear channel assessment (CCA) function to cause the WLAN to transmit. The WLAN operates on a WLAN channel which bandwidth is greater than the first WPAN channel bandwidth. The system comprises:
  one or more wireless network nodes (WNN) according to subject application wherein one WNN is a wireless network node manager WNNM). In the system, the WNN are configured to inform the WNNM when an interference indicator is greater than a given interference threshold. Further in the system, the processor of the WNNM is adapted to, upon being informed by the WNN:
    determine at least one neighbouring second WPAN channel different from the first WPAN channel, based on at least the interference indicator, the second WPAN channel being at least partly comprised within the WLAN channel bandwidth; and,
    instruct the WNN, based on a given mitigation strategy, while being in the mitigation mode, to continuously transmit a jamming signal in the second WPAN channel during a predetermined time period, at a given output power level sufficiently high so that the CCA function on the WLAN determines that it is not temporarily appropriate to transmit on the WLAN channel.

In certain embodiments of the subject application, it is included a method of providing interference mitigation in a wireless personal area network (WPAN) operating on a first WPAN channel, the interference originating from a wireless local area network (WLAN) using a clear channel assessment (CCA) function to cause the WLAN to transmit. The WLAN operates on a WLAN channel which bandwidth is greater than the first WPAN channel bandwidth. The method comprises:

providing one or more wireless network nodes, WNN, for example according to the first aspect of the invention;
determining one wireless network node manager, WNNM, out of the WNN.

The method comprises:

operating the WNN to inform the WNNM when an interference indicator is greater than a given interference threshold;
operating the processor of the WNNM to, upon being informed by the WNN:
  determine at least one neighbouring second WPAN channel different from the first WPAN channel, based on the interference indicator, the second WPAN channel being at least partly comprised within the WLAN channel bandwidth; and,
  instruct the WNN, based on a given mitigation strategy, while being in the mitigation mode, to continuously transmit a jamming signal in the second WPAN channel during a predetermined time period, at a given output power level sufficiently high so that the CCA function on the WLAN determines that it is not temporarily appropriate to transmit on the WLAN channel.

Certain embodiments of the subject application also include a non-transitory computer readable medium having stored thereon instructions for causing one or more processing units to execute the method of the subject application.

These and other aspects of the subject application will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
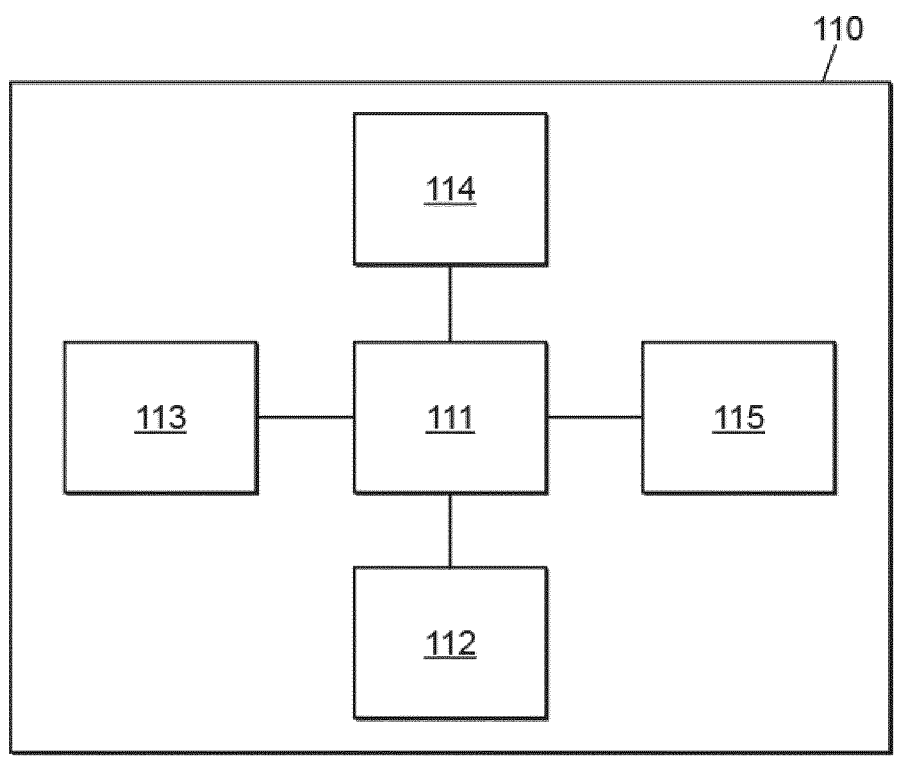
FIG. 1 is a schematic block diagram of a wireless network node in accordance with the subject application.

Because the illustrated embodiments of the subject application may for the most part, be composed of mechanisms, electronic components and circuits known to those skilled in the art, details will not be explained in any greater extent than that considered necessary for the understanding and appreciation of the underlying concepts of the subject application, in order not to obfuscate or distract from the teachings of the subject application.

The foregoing problem addressed by the subject application, that is enabling critical messages to be transmitted to all nodes of a wireless personal area network (WPAN) where it is difficult or not possible to avoid detected interference originating from a wireless local area network (WPAN), may be solved by mitigating the interference. Indeed, instead of avoiding detected WLAN interference, it is proposed a new type of wireless network node able to reduce the effect of the interference by jamming on one or more given frequencies comprised within the channel bandwidth used by the WLAN. In fact, most of the WLAN use a clear channel assessment (CCA) function to cause the WLAN to transmit. For example, with CCA function, a WLAN transceiver needs to sense the transmission medium (i.e. a channel) prior transmitting on that medium. Hence, if it is sensed that the medium is busy (i.e. the WLAN transceiver is hearing at least another transmission), then the WLAN transceiver cannot transmit its packet and has to wait until the medium is idle before trying to transmit again on the medium. The sensing process can be done through various ways, like direct measurements, or for example by exchange of preliminary short control messages on the channel (e.g. Ready To Send/Clear To Send messages for instance). Therefore, one of the idea of the proposed solution is to jam the WLAN, with sufficiently high power during a predetermined time period, such that the CCA function used on the WLAN determines that it is not temporarily appropriate to transmit on the channel used by the WLAN (i.e. due to the jamming). This way, during the period of time wherein the WLAN does not transmit, it is possible to transmit critical messages to all nodes of the WPAN. For example, lighting commands in a Zigbee Light Link network may be sent with confidence.

It is known that a Wi-Fi network uses a CCA function in the carrier-sense multiple access/collision avoidance (CSMA/CA) scheme. Therefore, in the following description, a Wi-Fi network will be used as an example of a WLAN. However, others WLAN such as, but not limited to, IEEE 802.11a, IEEE 802.16 and ETSI HyperLAN are also to be contemplated by the subject application. With regard to WPAN, it will be considered a Zigbee network as an example thereof. Nevertheless, others WPAN such as, but not limited to, IEEE 802.15.4, Zigbee Light Link (ZLL), RF4CE and 6LoWPAN are also to be contemplated by the subject application. In practice Wi-Fi and Zigbee are both working on the ISM (industrial, scientific and medical) frequency band. Nonetheless, others frequency bands may also be contemplated in the subject application, especially wherein a WLAN, using CCA function, operates on channel which bandwidth is greater than the bandwidth of the channel used a WPAN and wherein the WLAN interferes the WPAN.

Referring to FIG. 1, there is diagrammatically shown therein a wireless network node (WNN) 110 in accordance with the subject application. In FIG. 1 as shown, the WNN 110 may comprise:

a memory 112 such as, but not limited to, a volatile memory device or a non-volatile device, and the like;
an interference detector 113 such as, but not limited to, a spectrum density estimator, and the like;

a receiver 114 and at least one transmitter 115 such as, but not limited to, those conventionally used in Zigbee nodes, and the like; and, a processor 111 such as, but not limited to, a central processing unit (CPU) a microprocessor, a video processor, a front end processor, a coprocessor, a single-core processor, a multi-core processor, and the like.

In the example of FIG. 1, the memory 112 is adapted to store data such as messages or instruction commands directed to the WNN 110. For instance, in a Zigbee network, a message may be sent by a Zigbee router or another WNN 110 and an instruction command may be sent by a Zigbee Coordinator. In an example applying to Zigbee Light Link (ZLL) networks, an instruction command may be a dimming command and/or a switch on/off command transmitted by a ZLL node. The interference detector 113 is adapted to generate an interference indicator upon detection of an interfering signal in the channel within which the WNN 110 is currently working. For detecting the interfering signal, the interference detector 113 may implement spectrum sensing methods such as matched filtering methods, energy detection methods, and cyclostationarity detection methods. The receiver 114 is adapted to receive data such as messages or instruction commands which have been transmitted on a given channel frequency. The transmitter 115 is adapted to transmit a given signal over a given channel frequency. In FIG. 1, the processor 111 is operably coupled to the memory 112, the interference detector 113, the receiver 114 and the transmitter 115. Further, in accordance with the subject application, the processor 111 is adapted to operate in at least one of a normal mode and a mitigation mode. In the normal mode, the processor 111 operates as a conventional Zigbee node. Therefore, while being in the normal mode of operation of the processor 111, at least the minimum required operations performed by a conventional Zigbee node can be performed by the WNN 110. For instance, operations such as, but not limited to, receiving and transmitting messages and/or instruction commands are performed in the normal mode of operation of the processor 111. In an example, at start-up of the WNN 110, the processor 111 may automatically start to operate in the normal mode. In another example, the processor 111 of the WNN 110 may operate in the normal mode of operation in response to a given triggering signal. For instance, the triggering signal may be generated by a button located on the WNN 110 and which may be activated while the WNN 110 has already started-up. In the normal mode, the processor 111 is configured to determine whether an interference indicator is greater than a given interference threshold. The determination may be performed automatically at start-up of the WNN 110 and/or periodically when the WNN 110 has already started-up. The interfering signal may have been detected by the interference detector 113. As already explained above, the interfering signal perceived on the Zigbee network is originating from the Wi-Fi network. It is to be understood that the above-mentioned and generated interference indicator is an indicator of the level of interference perceived by the at least one WNN 110 of the Zigbee network 100. The interference indicator and the given interference threshold may be expressed as a power ratio of the detected interfering signal such as in dBm, for instance. For example, the interference indicator may be a received signal strength indication measurement (RSSI). In another example, the interference indicator and the given interference threshold may be represented as a fraction of time it is transmitted a signal within the channel used by the WLAN (i.e. the duty factor). When the interference indicator is greater than the given interference threshold, the processor enters the mitigation mode. In the mitigation mode, the processor 111 is configured to generate a mitigation signal (i.e. a jamming signal) able to disturb transmissions occurring on the WLAN channel. The mitigation signal may be any kind of signal which can be generated by the hardware used by the WNN 110. For instance in Zigbee, the mitigation signal may comprise the longest data packet supported by the standard. However, whatever the mitigation signal used, which is indeed a jamming signal, the content of the packets is not important and can be of any given nature. For example, the data packets piggybacked by the mitigation signal may comprise all the data bits set to 1. Later, based on at least the interference indicator, the processor is also adapted to determine a Zigbee channel different from the current channel used by the WNN 110, and on which the mitigation signal would be transmitted. For instance, once the interference indicator has be determined, the WNN 110 is able to scan the Zigbee network or part of the Zigbee network to determine if others Zigbee channels are interfered by the Wi-Fi interferer. At the end of the scanning, at least one of the scanned channels is chosen as the determined Zigbee channel. In certain embodiment, the scanning of the Zigbee network or part of the Zigbee network may be performed by another WNN 110 or specific apparatus. For example, if the current working channel of the Zigbee network is set to channel 12, the determined Zigbee channel need to be different from the working channel 12. For example, the determined Zigbee channel may be the channels 13 or 14. However, the determined Zigbee channel is selected so as to be at least partly comprised within the channel bandwidth used by the Wi-Fi network. Such an example is given in FIG. 3 in the configuration 300. Indeed, in the configuration 300 of FIG. 3, the working frequency of the Zigbee network is the channel 12 which is represented as a rectangle filled with horizontal lines. Further, in the configuration 300 of FIG. 3, the working channel of the Wi-Fi is represented by a trapezoid with the reference 20. In this configuration, the determined Zigbee channel may be at least one of channels 10, 11, 13, 14 and 15. In contrast, channels 9 and 16 may not be selected as the determined Zigbee channel. Indeed, as shown in the configuration 300 of FIG. 3, the Wi-Fi channel bandwidth fully covers four Zigbee channels (i.e. channels 11, 12, 13 and 14) and partly covers channels 10 and 15.

Further, the processor 111 is adapted to instruct the transmitter 115 to continuously transmit the mitigation signal in the determined Zigbee channel. However, in the case of a Zigbee network, some adjustments may need to be performed in order to enable continuous transmission. In fact, Zigbee networks may comprise a CCA function which needs to be disabled or reduced to the minimum value of the corresponding parameters so that continuous transmission is performed without prior using the CCA function. For example, some implementations of ZigBee Networks may require periodic Energy Detection Scan of the channel. Indeed, where a Zigbee network is interfered by a Wi-Fi network, it is clear that the CCA function of the Zigbee network, while activated, would determine not to transmit due to the interference generated by the Wi-Fi network. In fact, the transmission power used in a Wi-Fi network is much higher compared to the transmission power used in a Zigbee network. Indeed, the output power of Zigbee nodes usually approaches 0 dBm while the output power of Wi-Fi nodes usually approaches 15 dBm or above. Thus, by deactivating or limiting the CCA function of the proposed WNN 110, it would not be determined if it is appropriate to transmit before transmitting the mitigation signal. For example, the CCA function could be limited to the detection of interference of a different type than the interference originating from the Wi-Fi network (e.g. detection of neighboring ZigBee network). In contrast, in the proposed solution this operation is bypassed. Of course, depending on the used WPAN, specific adjustments at the reach of a person skilled in the art of wireless communication need to be performed. Such mechanism would force the mitigation signal to be continuously transmitted. In order for the jamming to be seen as significant by the CCA function of the Wi-Fi network, the mitigation signal need to be transmitted at a sufficiently high power level. For instance, the processor 111 may instruct the transmitter 115 to transmit the mitigation signal at the maximum power allowed by the used hardware (e.g. 20 dBm) over the determined Zigbee channel. In certain areas in the world, such high power may not be used due to law restrictions. In that case, the processor 111 may instruct the transmitter to transmit the mitigation signal at the maximum power level according to local laws and regulations. Further, it may only be necessary to transmit the mitigation signal during a predetermined time period. In fact, the CCA function of the Wi-Fi is associated with a backoff algorithm with determines a backoff period which is a waiting period for data transmission/reception when the channel of interest is busy. Laboratory experiments have shown that when a Wi-Fi is jammed as described by in the subject application, the backoff period last round about four milliseconds. This means that during four milliseconds after the Wi-Fi network has been jammed, no Wi-Fi packet will be transmitted. As already said earlier, one of the objectives of the subject application is to take advantage of this backoff period to transmit and receive critical Zigbee messages. In the example of Zigbee and Wi-Fi, the backoff period of four milliseconds is largely enough since the transmission time for Zigbee is round about two milliseconds.

To summarise, the proposed WNN 110 is able to jam a WLAN interferer with a mitigation signal transmitted at a sufficiently high power during a predetermined time period. The jamming is occurring on at least one channel being covered by the WLAN channel bandwidth and which is different from the current channel used by the WNN 110. This clearly means that the WNN 110 is able to change its operating frequency, from the current frequency to a determined Zigbee channel used to jam the WLAN interferer. This way, the current working channel of the WPAN network is not further interfered by the jamming of the WNN 110, since jamming occurs on a different Zigbee channel. As a result, during a given time period, the WLAN interferer holds its transmission and the nodes of the WPAN may transmit whatever critical information that need to be transmitted. For sure, the overall operations may be repeated as many times as needed. In an optimised way, it may be paid attention to the number of time the overall process is repeated. In fact, after reaching a maximum number of allowed backoffs in the WLAN, the packet on hold is normally dropped. Therefore, if one does not want the overall throughput of the WLAN to be reduced due to the dropped packets, it may be interesting to consider a parameter such as the macMaxCSMABackoffs used for instance in Wi-Fi networks. Additionally, the duration of the predetermined time period during which jamming is performed may be increase or shorten by the processor 111, each time the overall process repeats. For instance, for WNN 110 which are battery powered, transmitting at the maximum power repeatedly may not be the most suitable strategy since it would drain the battery very quickly. However, for instance, starting with the maximum transmission power first and then reducing the transmission power, by a given value, at each new start of the overall process may be a better idea to control power consumption.

In an embodiment of the subject application, the processor 111 may be configured to operate concurrently in the normal mode and the mitigation mode. Basically, in this embodiment, the processor of the WNN 110 is adapted to work in both modes during the same time period. Therefore, while entering the mitigation mode, the WNN 110 stays in the normal mode as well. This is configuration as the advantage that when the WNN 110 is operating in the mitigation mode, it is still possible to receive messages and/or instructions commands at the same time on the normal mode. This configuration greatly facilitates software and hardware development. Namely, being in the mitigation mode does not mean being disconnected from the Zigbee network. In this case, the WNN 110 should be able to receive data transmitted on the current working frequency of the Zigbee network and be able to transmit on the determined Zigbee channel, as already explained above. In another embodiment of the subject application, the processor 111 may be adapted to operate alternatively, in the normal mode and the mitigation mode. Therefore, while entering the mitigation mode, the WNN 110 leaves the normal mode. This is configuration as the advantage to reduce consumption power since the WNN 110 may only operate in a one mode at the time. As already explained above, in this embodiment, the processor 111 of the WNN 110 switches from the normal mode to the mitigation mode when an interference indicator is greater than a given interference threshold. However, in an example, the processor 111 of the WNN 110 may switch from the mitigation mode to the normal mode after the predetermined time period has elapsed. This means that the WNN 110 would only stay temporarily in the mitigation mode and get back to the normal mode once the mitigation mode operations are over.

Figure 2:
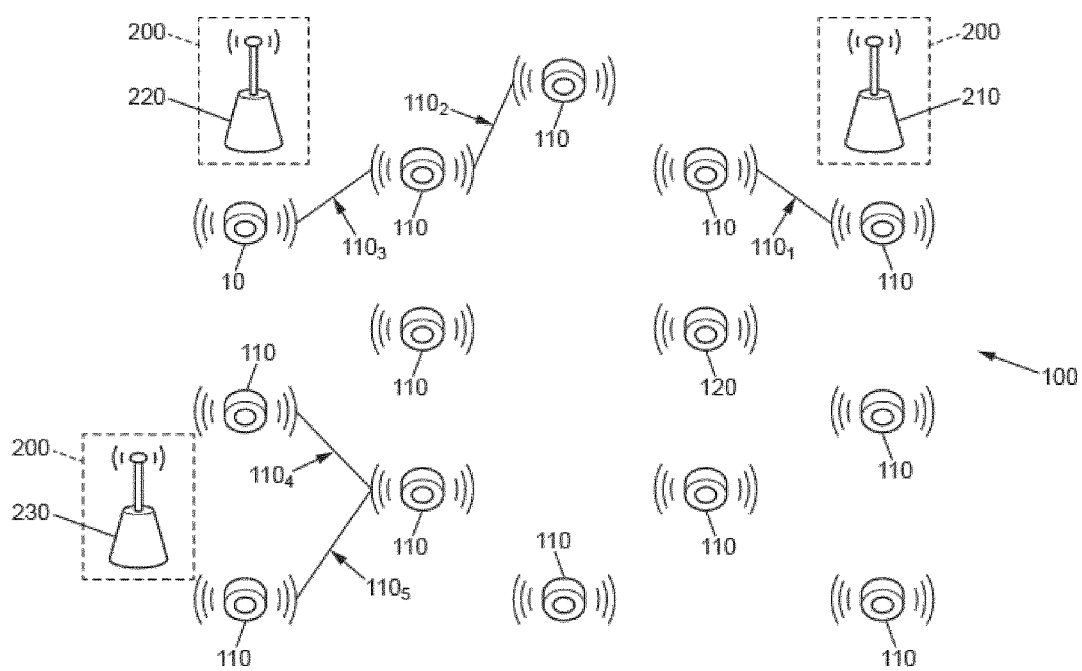
FIG. 2 is a schematic diagram of a system for providing interference mitigation comprising the wireless network node of FIG. 1.

Referring now to FIG. 2, there is diagrammatically shown therein a system for providing interference mitigation comprising the exemplary WNN 110 of FIG. 1. In FIG. 2, it is shown a Zigbee network 100 and a Wi-Fi network 200 which are co-existing on the ISM frequency band. In FIG. 2, the Zigbee network 100 as shown comprises one or more WNN 110 operating on a 2 MHz channel and the Wi-Fi network 200 comprises three Wi-Fi base stations (WBS) 210, 220, 230 operating on a 22 MHz channel. WBS 210, 220, 230 are conventional Wi-Fi base stations. It is to be understood that all WNN 110 and others Zigbee nodes of the Zigbee network 100 are using the same personal area network identification (i.e. PAN ID).

Figure 3:
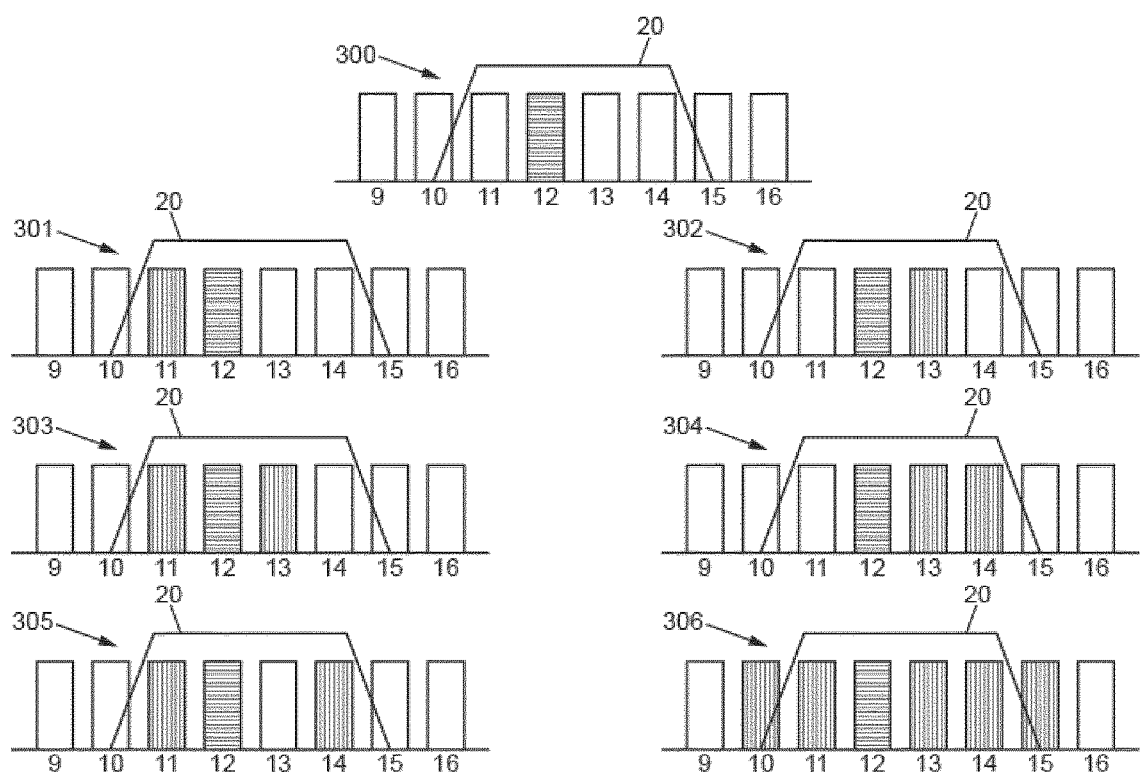
FIG. 3 is a schematic diagram of co-existing Zigbee and Wi-Fi channels according to the system of FIG. 2.

In the example of FIG. 2, all the WNN 110 are interconnected together by wireless connection links. Indeed, as it is well known by the one of ordinary skills in the art of wireless communication, a Zigbee network 100 uses mesh networking technologies that enable such connection links between the nodes of the network. In FIG. 2 as shown, only some wireless connection links $110_1$, $110_2$, $110_3$, $110_4$ and $110_5$ are represented. In FIG. 2, the connection link $110_1$ is interfered by the WBS 210, the connection links $110_2$ and $110_3$ are interfered by the WBS 220 and the connection links $110_4$ and $110_5$ are interfered by the WBS 210. In the system of FIG. 2, one of the WNN 110 is identified as a wireless network node manager WNNM 120. In practice, in a Zigbee network, the WNNNM 120 may be a Zigbee Coordinator or any other Zigbee node of the network. It is to be noted that the mitigation system of FIG. 2 is adapted to perform without the election of a WNNM 120. Indeed, as already explained above with regard to FIG. 1, each WNN 110 is able to mitigate on its own the Wi-Fi network while being under interference. However, where a WNNM 120 is elected in the system of FIG. 2, further advantages may be contemplated. Firstly, all the interference indicators may be sent over to the WNNM 120 for further analysis. To that end in the system of FIG. 2, the WNN 110 are configured to inform the WNNM 120 when an interference indicator is greater than the given interference threshold. Also, based on at least the interference indicator, the processor 111 of the WNNM 120 is configured to determine at least one Zigbee channel different from the current channel used by the Zigbee network 100. The determined Zigbee channel is at least partly comprised within the Wi-Fi channel bandwidth. FIG. 3 describes different channel allocation schemes in accordance with the system of FIG. 2. In the example of FIG. 3, in all represented allocation schemes 300, 301, 302, 303, 304, 305 and 306 there is shown the working channel of the Wi-Fi network 200 which is identified by the reference 20 and eight Zigbee channels identified by the references 9, 10, 11, 12, 13, 14, 15 and 16. In FIG. 3, the working frequency of the Zigbee network 100 is identified by a rectangle filled with horizontal lines and which has the reference 12. Additionally, allocated Zigbee channel(s) for the jamming operation in the mitigation mode are identified by a rectangle filled with vertical lines. For example, in the allocation scheme 300 no Zigbee channel is allocated in accordance with the subject application while in the allocation scheme 301, only the channel 11 is allocated. This means that in the allocation scheme 300, all the WNN 110 and the WNNM 120 are operating on the channel 12. Then in the allocation scheme 301 at least one WNN 110 is operating in channel 11, in the mitigation mode as already explained above. In the allocation scheme 302 at least one WNN 110 is operating in channel 13, in the mitigation mode as already explained above. In the allocation schemes 303, 304 and 305 two channels are allocated for the WNN 110 operating in the mitigation mode. As can be seen, the allocated Zigbee channel may be adjacent to the current channel 12 used by the Zigbee network 100. However, this is just an example, and others configurations where the allocated Zigbee channel is not adjacent to the current Zigbee channel, may be contemplated as well. Finally, in the allocation scheme 306, five channels are allocated for the WNN 110 operating in the mitigation mode. As can be seen, more than one channel may be used in collaboration to mitigate the Wi-Fi interference. As all WNN 110 report their interference indicator to the WNNM 120, the processor 111 of the WNNM is able to use at least these information to determine if one or more channels need be allocated for Wi-Fi interference mitigation. Indeed, based on a given mitigation strategy, while being in the mitigation mode, the processor 111 of the WNNM 120 is adapted to instruct the WNN 110 of the WPAN to continuously transmit the mitigation signal in the allocated Zigbee channel 9, 10, 11 13, 14, 15 and 16, during a predetermined time period, as already explained above.

In one embodiment of the system according to FIG. 2, the mitigation strategy consist in having one or more WNN 110 instructed to transmit concurrently on the same allocated Zigbee channel. For example, in the allocation scheme 303 of FIG. 3, a plurality of WNN 110 may mitigate the Wi-Fi network on the Zigbee channel 11 while another plurality of WNN 110 may mitigate the Wi-Fi network 200 on the Zigbee channel 13. This strategy has the advantage that the transmission power of several WNN 110 are combined together for a better mitigation of the Wi-Fi network 200. This strategy may be appropriate where several WNN 110 are under the Wi-Fi interference. In another embodiment of the system according to FIG. 2, the mitigation strategy consists in having only one WNN instructed to transmit on an allocated Zigbee channel. This strategy may be appropriate where few WNN 110 are under the Wi-Fi interference.

In another embodiment of the system according to FIG. 2 where the processor 111 of the WNN 110 operates alternatively in the normal mode and the mitigation mode and before the processor 111 of a first WNN switches to the mitigation mode, the processor 111 of the first WNN is configured to instruct at least one processor 111 of a second WNN 110 to receive data directed to the first WNN 110. In fact, in the subject application it is also proposed a delegation mechanism in the case where the processor 111 of the WNN 110 operates alternatively in the normal mode and the mitigation mode. In fact in this case, as already explained above, the WNN 110 may only operate on one of the normal mode and the mitigation mode, at a time. Hence, while operating in the mitigation mode, a WNN 110 may not communicate with the rest of the Zigbee network 100. This means that messages/instruction commands transmitted by others WNN 110, WNNM 120 or Zigbee coordinator may not be received by the WNN 110 being in the mitigation mode. Therefore, it is proposed a delegation mechanism where, for instance, messages/instruction commands directed to a WNN 110 operating in the mitigation mode are received by the receiver of another WNN 110. Later, during the predetermined time period wherein the first WNN 110 is in the mitigation mode, the processor 111 of the delegation WNN 110 is adapted to store in the memory 112 received data originally directed to the mitigation WNN 110. Finally, when the first WNN 110 switches back to the normal mode, the delegation WNN is adapted to send the stored commands to the first WNNN 110. It is clear that in this embodiment, the delegation mechanism is directly handled by the WNN 110 which can delegate its receiving function to another WNN 110.

In yet another embodiment of the system according to FIG. 2 where the processor 111 of the WNN 110 operates alternatively in the normal mode and the mitigation mode and before the processor 111 of a first WNN switches to the mitigation mode, the processor 111 of the first WNN 110 is configured to request the WNNM 120 to instruct at least one processor 111 of a second WNN 110 to receive data directed to the first WNN 110. Later, during the predetermined time period wherein the first WNN 120 is in the mitigation mode, the processor 111 of the second WNN 110 is adapted to store in the memory 112 received data originally directed to the first WNN 110. Finally, when the first WNN 110 switches back to the normal mode, the delegation WNN is adapted to send the stored commands to the first WNNN 110. It is clear that in this embodiment, the delegation mechanism is handled by the WNNM 120 on behalf of the WNN 110 which needs to switch to the mitigation mode.

In an embodiment, the WNNM 120 is configured to increase or shorten the predetermined time period. As already explained above, the overall operations of switching from the normal mode to the mitigation mode and vice versa may be repeated as many times as needed. This is why the duration of the predetermined time period during which jamming is performed may be increased or shorten by the processor 111, each time the overall process repeats. For instance, for WNN 110 which are battery powered, transmitting at the maximum power repeatedly may not be a brilliant strategy. However, for instance, starting with the maximum transmission power first and then reducing the transmission power at each new start of the overall process may be a better idea to control power consumption.

Figure 4:
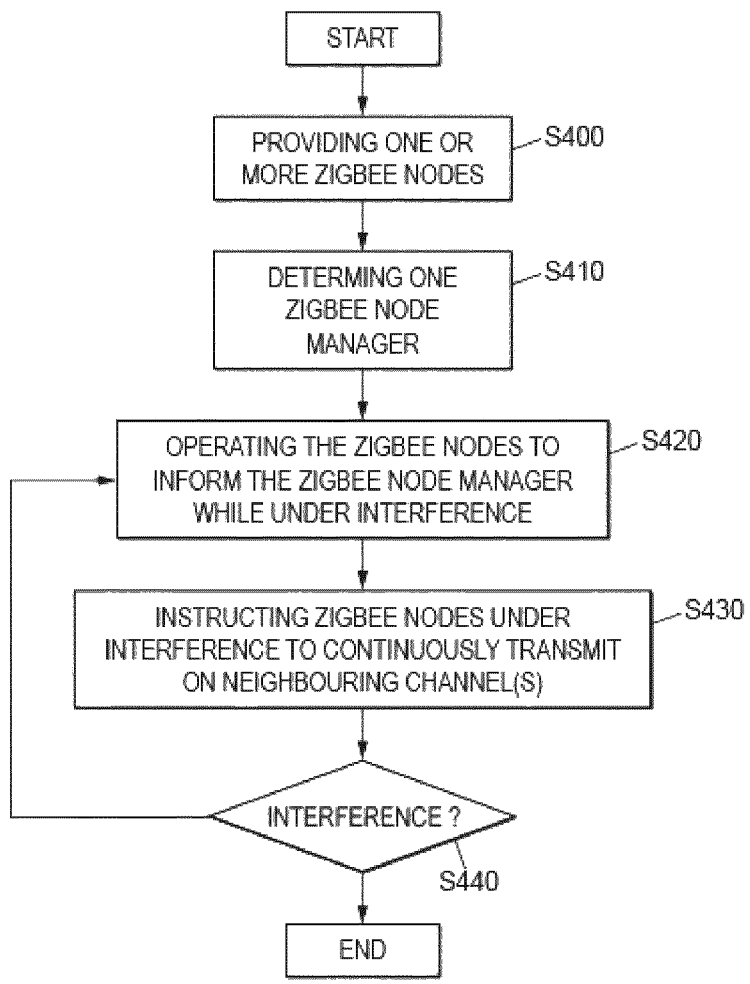
FIG. 4 is a schematic flow diagram of a method according to an embodiment of the subject application.

Referring now to FIG. 4, there is diagrammatically shown therein a flow diagram of a method according to the system of FIG. 2.

In S400, it is provided one or more WNN 100, as already explained above.

In S410, it is determined one WNNM 120 out of the WNN 110, as already explained above.

In S420, it is operated the WNN 110 to inform the WNNM 120 while being under interference, as already explained above.

In S430, the WNNM 120 is instructing the WNN 110 under interference to continuously transmit a mitigation signal on channel(s) neighbouring the current channel used by the WPAN, as already explained above.

Later in S440, it is determined if there is still strong interference on the current channel used by the WPAN. If this is the case, the mitigation mechanism is started again in S420. Otherwise, the method stops.

The skilled person would appreciate that the proposed solution takes advantage of the CCA function used by WLAN networks. Hence, by jamming the interfering WLAN channel during a predetermined time period, the interfering WLAN network is forced to withhold transmissions on the WLAN interfering channel during a backoff period of time. The solution of the subject application makes use of this backoff period to enable a WPAN network to transmit critical information such as, but not limited to, a request for changing the current working frequency. One other advantage of the proposed solution is that the format of the packet that is used is the standard one. In fact, contrary to others mitigation solutions, there is no need to alter the format of the WPAN packets in a specific way so that it can be detected by the WLAN interferer. Indeed, in certain solution the preamble of Zigbee packet is altered (e.g. increased) so that Wi-Fi knows that the Zigbee network is about to transmit. Another advantage of the proposed solution lies in the fact that the wireless node of the subject application does not need any collaboration with the WLAN network. Indeed, in some prior art solution, both a WPAN module and a WLAN module need be included in the same apparatus. That kind of solution is not easy and flexible for practical low cost implementation. In contrast, the proposed wireless node is solely a WPAN wireless node.

Of course, the above advantages are exemplary, and these or other advantages may be achieved by the proposed solution. Further, the skilled person will appreciate that not all advantages stated above are necessarily achieved by embodiments described herein.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

However, other modifications, variations and alternatives are also possible. The specifications and drawings are, accordingly, to be regarded in an illustrative rather than in a restrictive sense. For example, the receiver and the transmitter may be combined in a single unit instead of being two separate modules as it has been represented in the drawings. Of course others combinations of physical module may be combined together where appropriate.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The subject application scope is defined in the following claims and the equivalents thereto. Furthermore, reference signs used in the description and claims do not limit the scope of the subject application as claimed.

The principles of various embodiments of the invention can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

The invention claimed is:

1. A wireless personal area network, WPAN, node operating on a first WPAN channel and adapted to provide interference mitigation, the interference originating from a wireless local area network, WLAN, using a clear channel assessment, CCA, function to cause the WLAN to transmit, the WLAN operating on a WLAN channel having a bandwidth greater than the first WPAN channel bandwidth, the wireless network node comprising:

an interference detector adapted to generate an interference indicator upon detection of an interfering signal in the first WPAN channel;

at least one transmitter adapted to transmit a jamming signal; and, a processor operably coupled to the interference detector and the transmitter, the processor being adapted to operate in at least one of:

a normal mode in which the processor is configured to determine whether an interference indicator is greater than a given interference threshold; and, a mitigation mode, operable when the interference indicator is greater than the given interference threshold, in which the processor is configured to:
generate the jamming signal; and,
determine one neighbouring second WPAN channel different from the first WPAN channel, based on at least the interference indicator, the second WPAN channel being at least partly comprised within the WLAN channel bandwidth; and,
instruct the transmitter to continuously transmit the jamming signal in the second WPAN channel during a predetermined time period, at a given output power level sufficiently high so that the CCA function on the WLAN does not temporarily cause the WLAN to transmit on the WLAN channel.

2. The wireless network node of claim 1, wherein the processor is configured to operate:

concurrently, in the normal mode and the mitigation mode; or, alternatively, in the normal mode and the mitigation mode, wherein the processor switches from the mitigation mode to the normal mode after the predetermined time period has elapsed.

3. An interference mitigation system for providing interference mitigation in a wireless personal area network, WPAN, operating on a first WPAN channel, the interference originating from a wireless local area network, WLAN, using a clear channel assessment, CCA, function to cause the WLAN to transmit, the WLAN operating on a WLAN channel having a bandwidth greater than the first WPAN channel bandwidth, the system comprising:

one or more wireless network nodes, WNN, according to claim 1 wherein one WNN is a wireless network node manager, WNNM;

wherein:

the WNN are configured to inform the WNNM when an interference indicator is greater than a given interference threshold;

the processor of the WNNM is adapted to, upon being informed by the WNN:

determine at least one neighbouring second WPAN channel different from the first WPAN channel, based on at least the interference indicator, the second WPAN channel being at least partly comprised within the WLAN channel bandwidth; and, instruct the WNN, based on a given mitigation strategy, while being in the mitigation mode, to continuously transmit a jamming signal in the second WPAN channel during a predetermined time period, at a given output power level sufficiently high so that the CCA function on the WLAN does not temporarily cause the WLAN to transmit on the WLAN channel.

4. The system of claim 3, wherein the mitigation strategy is at least one of:

one or more WNN are instructed to transmit concurrently on the same second WPAN channel; and, one WNN is instructed to transmit on one second WPAN channel.

5. The system of claim 3, wherein the second WPAN channel is adjacent to the first WPAN channel.

6. The system of claim 3, wherein when the processor operates alternatively in the normal mode and the mitigation mode:

before the processor of a first WNN switches to the mitigation mode, the processor of the first WNN is configured to instruct at least one processor of a second WNN to receive data directed to the first WNN; and, during the predetermined time period wherein the first WNN is in the mitigation mode, the processor of the second WNN is adapted to store in a memory received data originally directed to the first WNN.

7. The system of claim 3 wherein when the processor operates alternatively in the normal mode and the mitigation mode:

before the processor of a first WNN switches to the mitigation mode, the processor of the first WNN is configured to request the WNNM to instruct at least one processor of second WNN to receive data directed to the first WNN; and, during the predetermined time period wherein the first WNN is in the mitigation mode, the processor of the second WNN is adapted to store the received data originally directed to the first WNN.

8. The system of claim 3 wherein the WNNM is configured to increase or shorten the predetermined time period.

9. A method of providing interference mitigation in a wireless personal area network, WPAN, operating on a first WPAN channel, the interference originating from a wireless local area network, WLAN, using a clear channel assessment, CCA, function to cause the WLAN to transmit, the WLAN operating on a WLAN channel having a bandwidth greater than the first WPAN channel bandwidth, the method comprising:

providing one or more wireless network nodes, WNN;

determining one wireless network node manager, WNNM, out of the WNN;

wherein the method comprises:

operating the WNN to inform the WNNM when an interference indicator is greater than a given interference threshold;

operating the processor of the WNNM to:

determine at least one neighbouring second WPAN channel different from the first WPAN channel, based on the interference indicator, the second WPAN channel being at least partly comprised within the WLAN channel bandwidth; and, instruct the WNN, based on a given mitigation strategy, while being in the mitigation mode, to continuously transmit a jamming signal in the second WPAN channel during a predetermined time period, at a given output power level sufficiently high so that the CCA function on the WLAN does not temporarily cause the WLAN to transmit on the WLAN channel.

10. The method of claim 9, wherein the mitigation strategy is at least one of:

one or more WNN are instructed to transmit concurrently on the same second WPAN channel; and, one WNN is instructed to transmit on one second WPAN channel.

11. The method of claim 10, wherein the second WPAN channel is adjacent to the first WPAN channel.

12. The method of claim 9 when the processor of WNN operates alternatively in the normal mode and the mitigation mode, wherein:

before the processor of a first WNN switches to the mitigation mode, the method further comprises operating the processor of the first WNN to instruct at least one processor of a second WNN to receive data directed to the first WNN; and, during the predetermined time period wherein the first WNN is in the mitigation mode, the method further comprises operating the processor of the second WNN to store in a memory received data originally directed to the first WNN.

13. The method of claim 9 when the processor of WNN operates alternatively in the normal mode and the mitigation mode, wherein:

before the processor of a first WNN switches to the mitigation mode, the method further comprises operating the processor of the first WNN to request the WNNM to instruct at least one processor of second WNN to receive data directed to the first WNN; and, during the predetermined time period wherein the first WNN is in the mitigation mode, the method further comprises operating the processor of the second WNN to store in a memory received data originally directed to the first WNN.

14. The method of claim 9 wherein the method further comprises operating the WNNM to increase or shorten the predetermined time period.

15. A non-transitory computer readable medium having stored thereon instructions for causing one or more processing units to execute the method according to claim 9.

* * * * *